(12) United States Patent
Hanazawa et al.

(10) Patent No.: US 6,231,826 B1
(45) Date of Patent: May 15, 2001

(54) PROCESS AND APPARATUS FOR REFINING SILICON

(75) Inventors: Kazuhiro Hanazawa; Masamichi Abe; Hiroyuki Baba; Naomichi Nakamura; Noriyoshi Yuge; Yasuhiko Sakaguchi; Yoshiei Kato; Fukuo Aratani, all of Chiba (JP)

(73) Assignee: Kawasaki Steel Corporation (JP)

( * ) Notice: Subject to any disclaimer, the term of this patent is extended or adjusted under 35 U.S.C. 154(b) by 0 days.

(21) Appl. No.: 09/391,564

(22) Filed: Sep. 8, 1999

Related U.S. Application Data

(62) Division of application No. 08/816,194, filed on Mar. 12, 1997.

(30) Foreign Application Priority Data

| Mar. 19, 1996 | (JP) | ................................................ 8-063319 |
| Oct. 30, 1996 | (JP) | ................................................ 8-288220 |
| Dec. 26, 1996 | (JP) | ................................................ 8-347961 |

(51) Int. Cl.⁷ .................................................. C01B 33/037
(52) U.S. Cl. ........................ 423/348; 422/188; 422/255; 23/308 R
(58) Field of Search ...................... 423/348; 422/188, 422/244, 255; 23/293 R, 308 R

(56) References Cited

U.S. PATENT DOCUMENTS

| 4,298,423 | 11/1981 | Lindmayer | 423/348 |
| 4,668,493 | 5/1987 | Levin | 423/348 |
| 4,789,506 | 12/1988 | Kasprzyk | 423/346 |
| 4,837,376 | 6/1989 | Schwirtlich et al. | 423/348 |
| 4,913,199 | 4/1990 | Falckenberg et al. | 141/98 |
| 5,220,804 | 6/1993 | Tilton et al. | 62/64 |
| 5,418,011 | 5/1995 | Pollak | 427/226 |
| 5,431,869 | 7/1995 | Kumar et al. | 264/85 |

FOREIGN PATENT DOCUMENTS

| 3241 366 A1 | 5/1984 | (DE) | 423/348 |
| 3403 131 A1 | 8/1985 | (DE) | 423/348 |
| 54-107884 | 8/1979 | (JP) | 423/348 |
| 3-215661 | 9/1991 | (JP) . | |
| 6-280004 | 10/1994 | (JP) | 423/348 |
| 6-345416 | 12/1994 | (JP) . | |
| 7-017704 | 1/1995 | (JP) . | |
| 7-309614 | 11/1995 | (JP) . | |
| 7-315827 | 12/1995 | (JP) | 423/348 |

OTHER PUBLICATIONS

Jacobson, C. A. "Encyclopedia of Chemical Reactions", vol. II, Reinhold Publishing Corp 1948, pp. 208–209, No Month.
"Purification of Metallurgical Silicon for Solar–grade silicon by Electron Beam Button Melting", vol. 32, No. 5, ISIJ 1992, pp. 635–642, No Month.
Translation of JP 7–315,827, Dec. 1995.*

* cited by examiner

Primary Examiner—Ngoc-Yen Nguyen
(74) Attorney, Agent, or Firm—Austin R. Miller

(57) ABSTRACT

Process and apparatus for refining silicon by treatment in a graphite vessel with irradiation with an electron beam while removing impurity elements by evaporation. A single graphite vessel is used, or plural graphite vessels are arranged in sequence. During treatment in successive graphite vessels, molten silicon is poured in succession from one vessel to another. Use of graphite vessels improves heat efficiency, prevents contamination and produces refined silicon containing very low contents of impurities.

3 Claims, 3 Drawing Sheets

PROCESS AND APPARATUS FOR REFINING SILICON

This application is a divisional of application Ser. No. 08/816,194, filed Mar. 12, 1997, incorporated herein by reference.

BACKGROUND OF THE INVENTION

1. Field of the Invention

The present invention relates to a process and an apparatus for refining silicon, particularly for enhancing removal of impurities such as P, Al and Ca by electron beam melting. The process and apparatus produce silicon having low concentrations of these impurities.

2. Description of the Related Art

In recent years, requirement for diversification in energy sources has caused solar power generation to be spotlighted. Generating apparatus of low cost has actively been researched and developed. Under such circumstances, silicon is likely to be most generally used as a raw material for solar batteries. Crystalline silicon has attracted the most serious attention as the material used for such a power supply.

It is recognized that high purity silicon having a purity of 99.9999% (6N) or more (hereinafter abbreviated as SOG-Si) is required for use as a raw material for solar batteries. Concentrations of impurities in the silicon have to be reduced to an order of parts per million or lower. A process has been proposed for producing high purity silicon from commercially available silicon metal (purity: 99.5%, hereinafter abbreviated as MG-Si), in which metallic impurities such as Al, Fe, Ti and the like are removed by directional solidification making use of small segregation coefficient. In this process C is deposited on the surface of the silicon by solidification, in the case of SiC, and is removed in the form of CO in the case of solid solution C; and B is removed by Ar plasma melting carried out while adding $H_2O$, $CO_2$ or $O_2$.

However, in the production process described above, the methods for removing the respective impurity elements are different from each other. The steps and facilities used are complicated. Moreover, a loss is caused in transfer from one step to a following step, and this lowers the silicon yield.

On the other hand, electron beam melting is usually used for melting high-melting metals such as titanium and molybdenum, and it is being researched for production of silicon used for a solar battery.

In Japanese Unexamined Patent Publication No. 61-232295, a copper-made vessel, cooled with water, is used in order to prevent contamination caused by vessel materials in electron beam melting of silicon metal. Japanese Unexamined Patent Publication No. 63-64909 discusses making a silicon sheet for a solar battery by combining a water-cooled copper hearth (having a small depth) with electron beam melting. Further, proposed in Japanese Unexamined Patent Publication No. 5-124809, is a solidification refining process in which a temperature gradient is provided in a vertical direction by melting only an upper part of a silicon metal held in a cast vessel, making use of local heating by an electron beam, and cooling the lower part of the silicon metal.

Also proposed is a method for removing P under reduced pressure by making use of its high vapor pressure. However, it takes a long time to remove P under reduced pressure. Recently, however, it is reported that P contained in silicon can be removed in a short time by electron beam melting [ISIJ International, vol. 32 (1982), No. 5, p. 635 to 642].

Further, an indicated advantage of electron beam melting is that Al and Ca as well as P can be removed together. However, in electron beam melting using conventional techniques, the removal limits for P, Al and Ca contained in silicon are about 3 ppmw, about 470 ppmw and about 150 ppmw, respectively. Since the concentrations of P, Al and Ca contained in silicon become almost fixed values in a melting time of 15 minutes or more, the contents of P, Al and Ca cannot be expected to be reduced any further. It is not reasonable to suspect that the electron beam melting method has been sufficiently investigated to achieve a purity required for SOG-Si, which is about 99.9999% Si or more.

We have independently proposed a so-called skull melting procedure, using water-cooled copper for a vessel (crucible, mold, hearth or the like) for holding the silicon, and that has made it possible to achieve a degree of purity as required for a silicon solar battery (Japanese Unexamined Patent Publication Nos. 7-309614 and 7-325827). High purity silicon is solidified at a location in contact with a water-cooled copper, vessel, and the silicon is melted in the inside of a solidified shell referred to as a skull. According to this method, contamination originating in impurities contained in the silicon adhered to the vessel can be prevented. Regrettably, however, this method has encountered the problem that about two-thirds of the energy held by the electron beam is taken up by the cooling water. Thus, the remaining energy contributing to melting is small, and very much reduces the heat efficiency of the treatment.

SUMMARY OF THE INVENTION

It is accordingly an important object of the present invention to provide a silicon refining method having high heat efficiency while impurities are evaporated and removed from the silicon by electron beam melting.

Another object of the present invention is to provide an efficient and practical technique for evaporating and removing P, Al and Ca from silicon by limiting reduction of rate of impurity removal caused by contamination.

We have discovered that these and other objects can be achieved by specially enhancing the efficiency of heat transfer from an electron beam to silicon and elevating the temperature of the molten silicon. The rate of removing P, Al and Ca is increased as the temperature of the molten silicon is elevated. It has also been confirmed that when electron beam melting is carried out in a water-cooled copper vessel, the amount of heat taken away by the water-cooled copper vessel is as much as about 60 to 70% of the beam input.

We have discovered that a large amount of this heat can be retained by using a vessel having low heat conductivity, or even a vessel having no water-cooling system. In this way the temperature of the molten silicon at a fixed electron beam output can be significantly elevated.

The present invention relates to a process for refining silicon by melting silicon in a graphite vessel by irradiation with an electron beam to evaporate volatile impurity elements contained in the silicon in a graphite vessel. Further, the present invention relates to reducing the concentrations of impurities contained in the graphite vessel by an amount that is greater than the target amounts of selected impurities contained in the refined silicon, particularly by controlling the density of the graphite in the vessel to. about 1.5 g/cm³ or more.

DETAILED DESCRIPTION OF THE INVENTION

In the present invention, molten silicon held in a graphite vessel, melted by an electron beam, loses much less heat than the loss in a conventional water-cooled copper vessel. Therefore its melting energy is greatly increased. As a result, the amount of silicon melted and the rate of removal of volatile impurities are both increased, causing the silicon to be refined efficiently. Further, the effect described above can be enhanced even further by sharply decreasing the concentrations of impurities contained in graphite. The need for bleeding molten silicon from the vessel to interrupt the refining work can be prevented by increasing the density of the graphite to about 1.5 g/cm$^3$ or more.

In the present invention, graphite is the material in which the silicon is melted. It is important that: (1) the graphite has a high melting point and therefore resists damage by melting or evaporation, even when irradiated directly with the electron beam, (2) the saturated dissolved carbon content of the molten silicon is as low as 10 to 100 ppmw (parts per million by weight), and the carbon can readily be removed by oxidation, (3) graphite has the excellent characteristic that it does not react with silicon to generate any gas which would reduce vacuum in the furnace and in the electron beam gun, and (4) graphite is inexpensive as compared with other high melting materials.

Figure 1:
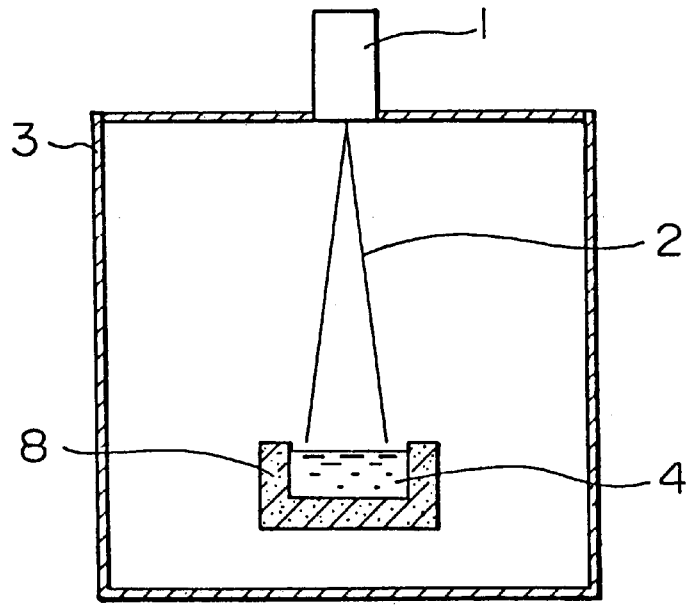
FIG. 1 is a cross section of an apparatus for refining silicon in a single graphite vessel according to the present invention.
Figure 3:
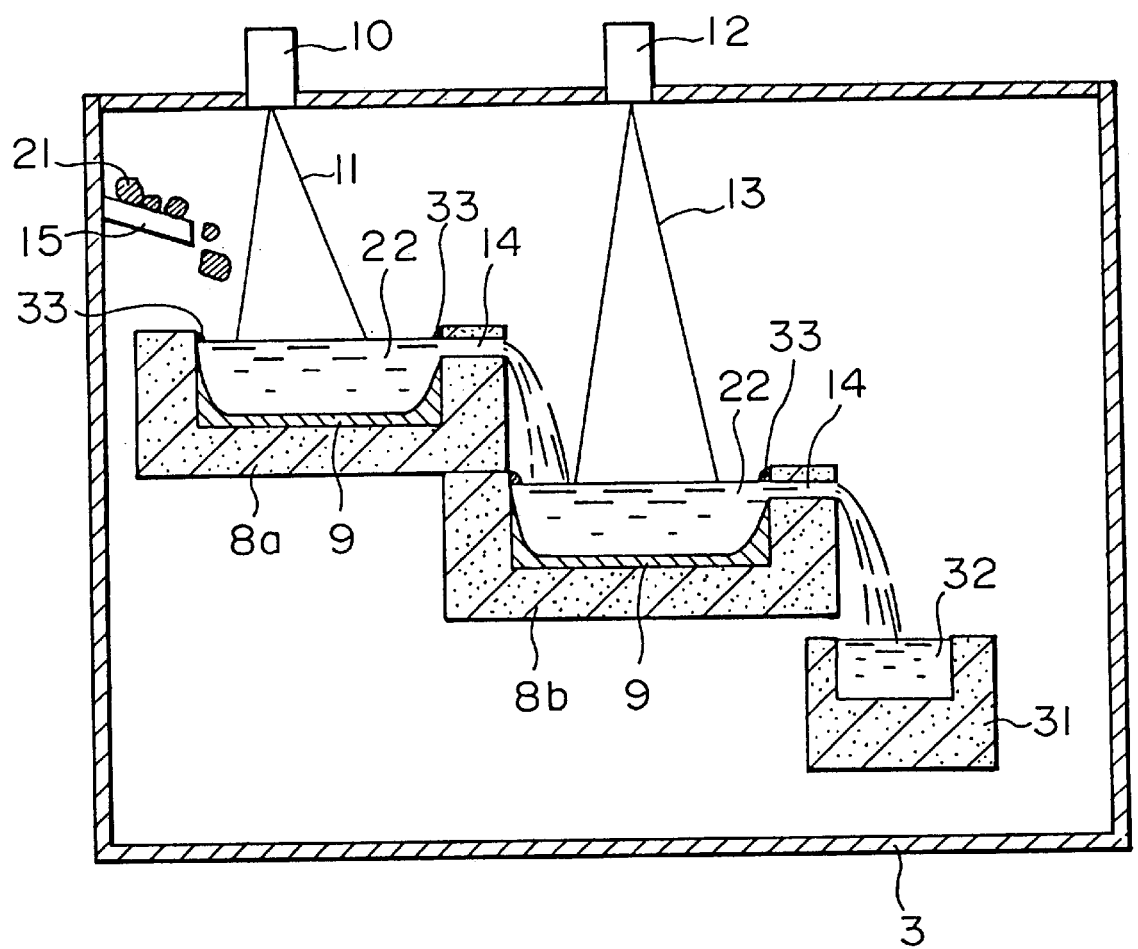
FIG. 3 is a schematic drawing illustrating one embodiment of the process for continuously refining silicon in successive graphite vessels according to the present invention.
Figure 4:
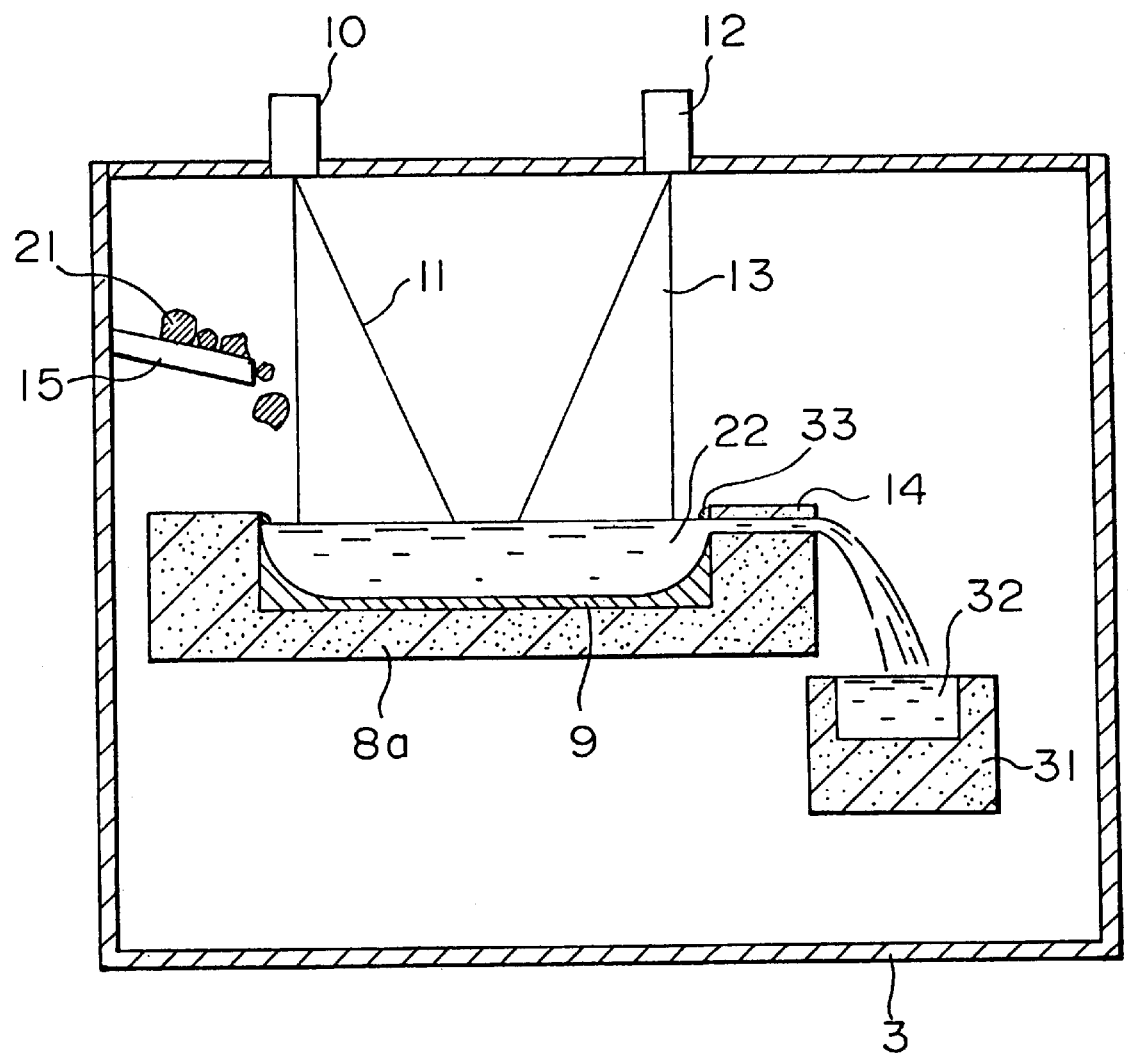
FIG. 4 is a schematic drawing illustrating another embodiment of a process for continuously refining silicon in the graphite vessel of the present invention.

Further, when a graphite vessel is used, as in FIGS. 1, 3 and 4, the vessel does not have to be cooled with water. Since electron beam melting is carried out in a vacuum, heat lost from the graphite vessel by radiation accounts for a great part of the entire amount of lost heat, and therefore an excellent heat insulating effect is obtained. Further, if a conventional refractory material or other material having a low radiant coefficient and low heat conductivity is disposed around the periphery of the graphite vessel 8, either in contact therewith or with a space provided therebetween, an even greater heat insulating effect can be obtained.

It is a preferred feature of this invention that the graphite impurities have lower concentrations than the target concentrations of the impurities contained in the refined silicon. Otherwise, if the silicon is melted in a graphite vessel containing impurities of higher concentrations, the molten silicon could be contaminated by the graphite vessel in some cases.

Such high purity graphite may be produced by processing graphite at high temperatures in an environment of halogen gas, followed by mechanical processing.

Further, in the present invention, the graphite preferably has a density of about 1.5 g/cm$^3$ or more. Graphite having a density less than about 1.5 g/cm$^3$ can permit molten silicon to wet and penetrate into the wall of the graphite vessel, and sometimes even to bleed out of the vessel. In such a situation the refining work with the electron beam has to be discontinued.

Further, the present invention relates to the use of plural successive graphite vessels under reduced pressure. This even more efficiently refines the silicon. Solid raw material silicon is supplied to a vessel and irradiated with an electron beam. After melting all or some of the silicon, molten silicon is poured into a successive vessel and subjected to further electron beam treatment, and the resulting molten silicon is poured in succession into any number of successive vessels arranged in series while further irradiating with the electron beam.

Further, the present invention is characterized by providing in a vacuum chamber the equipment for supplying the solid raw material silicon, providing plural graphite vessels each equipped with means for pouring molten silicon into a subsequent vessel, an electron beam device for melting silicon in one or more of the vessels, and a solidifying receiver for the molten silicon product.

Contamination of molten silicon caused by impurities present in the circumference of the vessel is prevented by using a clean electron beam as a heating source, placing the environment under a high vacuum and using a graphite vessel, and the heat loss is controlled to the minimum to enhance heat efficiency. In addition, contamination caused by solid state raw material containing large amounts of impurities or evaporated silicon is prevented in order to carry out the evaporative removal of P, Al and Ca effectively.

In the conventional electron beam melting, the minimum concentrations of P, Al and Ca contained in silicon product have been about 3 ppmw, about 470 ppmw and about 150 ppmw, respectively. The melting time (irradiating time with a beam) falls in a range of about 15 minutes or more. Heretofore it has been essentially impossible to achieve a higher degree of purification than the above. This is attributed principally to the presence of various species of contaminations. These contaminations are increased after for a long time, or after many times.

We believe that high purification of silicon was found to be difficult, at least in part, because melting was often carried out by heating from a single direction directed at the upper portion of the substance to be melted. Melting therefore depended on the dimensions of the vessel, the amount of silicon and the output of the electron beam. On the other hand, P, Al and Ca are found to diffuse gradually from solid feed material which remains for a time in the vessel, such as at the bottom or on a side wall. Such solid material contains large amounts of P, Al and Ca. This also occurs in the case of evaporated silicon which adheres to the vessel after melting, and contains relatively large amounts of P, Al and Ca.

We have conducted many tests on silicon melted with an electron beam and solidified in the vessel. The distribution of concentrations of P, Al and Ca contained in the silicon in the vessel was investigated. This confirmed that the concentrations of P, Al and Ca present at the bottom and side wall were higher by ten times or more than the P, Al and Ca present in other parts of the vessel. Accordingly, it has been discovered that such contamination, when significant, should be prevented so that the amounts of P, Al and Ca in the product can further be reduced.

According to a reported example relating to Ti (ISIJ, International, vol. 32 (1992), No. 5, p. 607 to 615) Ti was melted by an electron beam with the result that the Ti inside of the vessel remained uniformly distributed, and the concentration of Al contained in Ti in the vessel was almost uniform throughout. Accordingly, the lack of uniformity in the concentrations of P, Al and Ca contained in silicon is considered to be quite unusual, and peculiar to silicon and those impurities. Further, it is considered that the tiny concentrations of the P, Al and Ca impurities contained in silicon are measured as parts per million, emphasizing and accentuating the problem of contamination. It is also considered that silicon has a lower density in the solid state than in the molten state, and therefore solid silicon can overflow from a vessel in a continuous melting process without remaining in the vessel for a long time.

Plural graphite vessels are an important feature of this invention. When one vessel supplies molten silicon to any other vessel, the supplied silicon is one from which P, Al and Ca have already been at least partially removed. Silicon having high concentrations of P, Al and Ca which might remain at the bottom of a molten silicon bath or on the wall surface of its vessel is not supplied to the subsequent vessel. Since the concentrations of P, Al and Ca contained in already-treated silicon are lower in a subsequent vessel in the process, contamination caused by evaporated silicon adhered to a wall surface is decreased in the subsequent vessel. Further, the preceding raw material supplied can be prevented as well from overflowing without remaining for a prescribed time.

If a single graphite vessel is used, the contents of P, Al and Ca contained in the silicon cannot be removed completely due to contamination caused by solid raw material remaining at the bottom of the molten silicon and by silicon which adhered to the vessel wall immediately after melting or after evaporation. Such silicon contains larger amounts of P, Al and Ca. In this case, even if P, Al and Ca can be removed, the concentrations of impurities are dispersed and influence exerted by contamination is increased after melting for a long time, or after many times. This is in some cases a disadvantage in the use of a single graphite vessel for intensive mass production.

Molten silicon may be supplied from one vessel to one or more subsequent vessels continuously or in a batch system. The locations where the graphite vessels are disposed, and the locations of the supply of molten silicon from each of the graphite vessels to its successor is often optional, as long as the molten silicon can be effectively transferred from vessel to vessel.

Molten silicon is preferably transferred by overflow from a graphite vessel while continuously supplying a solid raw material at the feed end. This vessel produces continuously a wholly or partially treated silicon that contains reduced amounts of P, Al and Ca, in a molten state. This is an advantage because molten silicon which occupies the upper portion of the vessel, and which contains the most purified portion of the silicon, is preferentially caused to overflow.

In addition to P, Al and Ca described above, other impurities enabled to be reduced by the present invention include Ni, Ge, Cu, Sn, Ag, In, Mn, Pb, Sb and Tl, each having a higher vapor pressure than that of silicon.

The present invention accordingly relates to a process for refining silicon by melting silicon in a vessel comprising graphite under reduced pressure by irradiation with an electron beam to remove volatile impurity elements such as P, Al and Ca contained in the silicon by evaporating them, wherein the silicon is melted in a graphite vessel.

It is particularly advantageous to use a succession of two or more graphite vessels, wherein solid raw material silicon is supplied to one vessel and irradiated with an electron beam; to melt the solid raw material silicon; the resulting molten silicon is poured from the aforementioned first vessel into another successive graphite vessel when more than two vessels are provided, the resulting molten silicon may be poured in. succession into any number of subsequent vessels either with or without further irradiating the molten silicon with the electron beam.

The above process is preferably characterized by use of such pure graphite that the concentrations of impurities in the vessel material are less than the target concentrations of the impurities contained in the refined silicon.

Further, the present invention relates to an apparatus for refining silicon by melting silicon in a graphite vessel under reduced pressure by irradiation with an electron beam to remove volatile impurity elements contained in the silicon by evaporating them, characterized by the combination of a vacuum chamber, means for supplying solid raw material silicon to a graphite vessel in the chamber, plural graphite vessels each equipped with means for pouring molten silicon into a subsequent graphite vessel, an electron beam gun for melting silicon in some or all of the graphite vessels, and a receiver for receiving and solidifying the final purified molten silicon.

EXAMPLES

Example 1

Single Graphite Vessel

Figure 2:
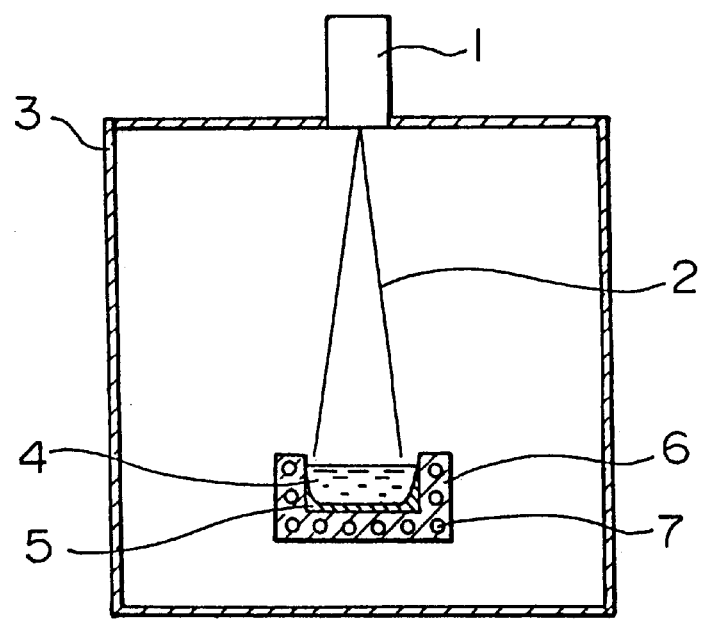
FIG. 2 is a cross section of an apparatus using a conventional single water-cooled copper vessel.

One form of the apparatus used in this invention is shown in FIG. 1. An apparatus used in a conventional process is shown in FIG. 2. Each is provided with a vacuum chamber 3, with a water-cooled copper vessel 8 in FIG. 2, and with a graphite vessel 8 in FIG. 1, wherein an electron beam gun 1 having a maximum output in the 100 kW class is provided on the vessel. With respect to the dimensions of these vessels, one example of the surface area is 150×300 mm$^2$, and the depth is 80 mm. Different vessels were provided in which the impurity concentrations of P, Al and Ca were 10 ppmw, 20 ppmw and 10 ppmw, respectively and these vessels were variously provided with graphite in different densities in a range of 1.0 to 1.8 g/cm$^3$.

The vessels were each charged with 2.5 kg of commercial MG-Si (impurity concentrations were P: 20 ppmw, Al: 800 ppmw, Ca: 700 ppmw and C: 900 ppmw). The MG-Si was a powder having particle diameters of 1 to 3 mm. Electron beam melting was carried out while maintaining the pressure of the vacuum chamber at 1×10$^{-4}$ Torr to refine the MG-Si to create crystalline silicon having a high purity. In this case, the output of the electron beam 1 was controlled at one of two levels of 30 and 60 kW, and in each case the irradiation time was 30 minutes. In the case of using a water-cooled copper vessel according to a conventional method, high purity silicon (impurity concentrations in silicon; P: 0.1 ppmw or less, Al: 0.1 ppmw or less, Ca: 0.1 ppmw or less and C: 0.1 ppmw or less) was melted in advance by an electron beam, and silicon was melted as a silicon film 5 (skull) prepared by solidifying the molten silicon.

The molten amounts of refined silicon obtained in the above melting conditions, and the concentrations of P, Al and Ca contained in the silicon products were analyzed by means of inductive coupled plasma emission spectral analysis. The results are shown in Table 1. In the case of a water-cooled copper vessel 6, the amount of silicon melted was 1.2 kg (about 50% of the charged amount) in an electron beam output of 30 kW, and in the case of the graphite vessel 8, the amount melted was 2.5 kg (the whole of the charged amount) which was about twice as much as that of the water-cooled copper vessel 6. It was clarified from these results that the heat efficiency was sharply increased because of the effect of the graphite vessel 8, and the amount of silicon melted at a constant electron beam output was increased to a large extent as compared to a conventional one.

With respect to the concentrators of impurities contained in the silicon, it was found that in using the graphite vessel 8, the rate of removal of impurities was increased as compared with the water-cooled copper vessel 6, and the time required for removing the impurities was shortened. With respect to the concentration of carbon, a difference was scarcely observed. Carbon coming from the graphite vessel 8 presented no problems.

TABLE 1

| No. | Vessel | Output of electron beam (kw) | Dissolved amount of silicon (kg) | P (ppmw) | Al (ppmw) | Ca (ppmw) | C (ppmw) | Remarks |
|---|---|---|---|---|---|---|---|---|
| 1 | Water-cooled copper | 30 | 1.2 | 1.0 | 70 | 1.1 | 35 | Comp. Ex. |
| 2 | Water-cooled copper | 60 | 2.5 | 0.9 | 82 | 1.5 | 37 | Comp. Ex. |
| 3 | Graphite | 30 | 2.5 | 1.1 | 73 | 1.2 | 43 | Example |
| 4 | Graphite | 60 | 2.5 | 0.5 | 39 | 0.4 | 56 | Example |

Further, the respective graphite vessels were observed with the naked eye to ascertain the presence or absence of "bleeding". Results are shown in Table 2 which follows. The minute pores of graphite having a density of 1.5 g/cm$^3$ did not cause or permit "bleeding" of silicon out of the vessels.

TABLE 2

| No. | Vessel density | Presence of bleeding | Yield of silicon (%) | Remarks |
|---|---|---|---|---|
| 1 | 1.0 | Presence | 0 | Comp. Ex. |
| 2 | 1.3 | Presence | 0 | Comp. Ex. |

TABLE 2-continued

| No. | Vessel density | Presence of bleeding | Yield of silicon (%) | Remarks |
|---|---|---|---|---|
| 3 | 1.5 | None | 83 | Example |
| 4 | 1.8 | None | 85 | Example |

Example 2
Single High Purity Graphite Vessel

The graphite vessel 8 tested in this Example had a higher purity than in Example 1. The impurity concentrations of P, Al and Ca in the vessel were less than 0.1 ppmw. The vessel was placed in the same vacuum apparatus as that used in Example 1, and this was charged with commercial silicon metal as was the. case with the preceding example, to melt the silicon at selected electron beam outputs of 30 and 60 kW.

The refined silicon obtained was chemically analyzed by means of the ICP emission spectral analysis, and we obtained the results shown in Table 3. As is apparent from the comparison of run No. 3 with run No. 4 in Example 1, it was found that graphite having higher purity significantly reduced the concentrations of impurities contained in the refined silicon product. This confirmed that the effect was further increased by providing the graphite vessel 8 with a higher purity than the target concentrations of impurities contained in the refined silicon.

TABLE 3

| No. | Vessel | Output of electron beam (kw) | Dissolved amount of silicon (kg) | P (ppmw) | Al (ppmw) | Ca (ppmw) | C (ppmw) | Remarks |
|---|---|---|---|---|---|---|---|---|
| 5 | Graphite | 33 | 2.5 | 0.6 | 42 | 0.7 | 43 | Example |
| 6 | Graphite | 60 | 2.5 | 0.2 | 21 | 0.2 | 54 | Example |

Example 3
Two or More Graphite Vessels

A schematic drawing of an apparatus provided with two successive melting vessels is shown in FIG. 3. Two graphite vessels 8a, 8b were disposed in a vacuum chamber 3, and two electron beam guns 10, 12, each having a maximum output of the 100 kW class were provided over the graphite vessels 8a, 8b. Refined silicon 22 was poured into a graphite casting mold (receiver) 31. With respect to the form of the graphite vessels 8a, 8b, each had a surface area of 150×300 mm on the surface of molten metal and a depth of 80 mm. The height of an overflow port 14 is 60 mm above the surface of molten metal in the subsequent vessel.

The apparatus described above was used to charge the upper or initial graphite-vessel 8a with 2.5 kg of the same MG-Si powder as that used in Examples 1 and 2, and the silicon was irradiated with an electron beam 11 having an output of 30 kW from the electron beam gun 10 while scanning the surface of the molten metal, whereby the silicon was melted. After melting for 5 minutes, raw material silicon 21 (MG-Si) was charged from a raw material feeder 15 at a controlled rate. Molten silicon 22 accordingly overflowed from an overflow port 14 of the initial graphite vessel 8a and was received in the subsequent graphite vessel 8b, and the molten silicon 22 in the graphite vessel 8a and the graphite vessel 8b were irradiated respectively with the electron beams 11, 13 each having an output of 30 kW from the electron beam guns 10, 12 while scanning the surfaces of the molten metal. The molten silicon 22 overflowed from the overflow port 14 of the subsequent graphite vessel 8b into a graphite casting mold (receiver) 31. Electron beam melting was continued in graphite vessels 8a, 8b until 10 kg of refined silicon had been collected in the graphite casting mold 31. In this case, a deposit 33 was observed to have adhered to the upper edge of the inside of each of the graphite vessels 8a, 8b. Solid state silicon 9 remained at the bottom of each graphite vessel 8a, 8b.

The purified silicon product 32 obtained under the conditions described above was chemically analyzed by the ICP method. The results are shown in Table 4. According to these results, when supplying the raw material continuously, the concentrations of P, Al and Ca contained in the silicon were reduced to 0.2 ppmw, 10 ppmw and 0.5 ppmw or less, respectively, in a short time by using two graphite vessels 8a, 8b in series and selecting a suitable flow rate of the raw material.

guns 10, 12 having a maximum output of the 100 kW class were provided over the graphite vessel 8a. Each vessel 8a, 8b of FIG. 3 had one-half of the molten metal as compared with the vessel of FIG. 4. The pressure of the vacuum chamber 3 of FIG. 4 was set to $1 \times 10^{-4}$ Torr. The above apparatus had the same capacity as that of the melting apparatus shown in FIG. 3. Refined silicon was recovered in a graphite casting mold 31. With respect to the form of the graphite vessel, its surface area was 150×600 mm on the surface of the molten metal, and its depth was 80 mm. The height of an overflow port 14 is 60 mm above the surface of molten metal in the subsequent vessel. The pressure of the vacuum chamber was $1 \times 10^{-4}$ Torr, and the output of each of the electron beams 11, 13 from electron beam guns 10, 12 was 30 kw.

The apparatus described above was used to charge the graphite vessel 8a of FIG. 4 with 5 kg of MG-Si powder, and the silicon was irradiated with both of the electron beams 11, 13 each having an output of 30 kW from the electron beam guns 10, 11 while scanning the surface of molten metal, whereby the silicon was melted, After melting for 5 minutes, MG-Si which was the raw material was charged from a raw material-supply 15 at a prescribed rate. Refined, molten silicon 22 accordingly overflowed from the overflow port of the graphite vessel 8a and was received in a graphite casting mold 31. Electron beam melting was continued until 10 kg of the refined silicon was collected.

The silicon product obtained under the conditions described above was chemically analyzed by the ICP method. The results are shown in Table 5. According to these

TABLE 4

| No. | Supplying rate of raw material (kg/hr) | Melting time after starting supply of raw material (hr) | Concentration of phosphorus in silicon (ppmw) | Concentration of aluminum in silicon (ppmw) | Concentration of calcium in silicon (ppmw) | Remarks |
|---|---|---|---|---|---|---|
| 1 | 2 | 5.0 | 0.05 or less | 18 | <0.1 | Example |
| 2 | 4 | 2.5 | 0.11 | 20 | 0.3 | Example |
| 3 | 6 | 1.7 | 0.70 | 50 | 0.8 | Example |

Example 4

A schematic drawing of the melting apparatus used in this Example is shown in FIG. 4. A single graphite vessel 8a was disposed in a vacuum chamber 3, and two electron beam results, it was found that the concentrations of P, Al and Ca contained in the silicon were reduced to about 0.8 ppmw, about 50 ppmw and 0.8 ppmw, respectively in the single graphite vessel of this Example.

TABLE 5

| No. | Supplying rate of raw material (kg/hr) | Melting time after starting supply of raw material (hr) | Concentration of phosphorus in silicon (ppmw) | Concentration of aluminum in silicon (ppmw) | Concentration of calcium in silicon (ppmw) | Remarks |
|---|---|---|---|---|---|---|
| 4 | 2 | 5.0 | 0.6 | 55 | 0.8 | Example |
| 5 | 4 | 2.5 | 0.7 | 69 | 0.9 | Example |
| 6 | 6 | 1.7 | 0.8 | 80 | 1.0 | Example |

As described above, since the graphite vessel is not required to be cooled with water in melting silicon under an electron beam, impurities can efficiently be removed by electron beam melting, and crystalline silicon can be produced with high purity and with high productivity.

Further, in the present invention, contamination caused by unmelted solid state raw material which remains at the bottom of the molten silicon and contains P, Al and Ca in large quantities, and silicon which is adhered to the graphite crucible immediately after melting or after evaporating and contains P, Al and Ca in large quantities, can be prevented. Accordingly, P, Al and Ca contained in silicon can be reduced, and silicon in which the concentrations of P, Al and Ca are 0.2 ppmw, 10 ppmw and 0.5 ppmw, respectively can be readily produced in a short time.

It will be appreciated that this invention may be practiced with one or more than one graphite vessel, with one or more than one vacuum chambers or with one or more than one electron beam irradiators, and that multiple vessels may be physically arranged in a variety of different ways, in series or parallel or various combinations or modifications. While this specification has particularly emphasized the removal of P, Al and Ca as especially significant, and difficult impurities, the invention is capable of removing many other impurities as well, especially those having a higher vapor pressure than silicon.

Many other variations may be made in the process or apparatus, including the use of certain features independently of other features, reversals of the order of method steps, and the substitution of equivalents, all within the scope and spirit of the invention as defined in the appended claims.

What is claimed is:

1. A process for removing from silicon one or more impurities selected from the group consisting of P, Al and Ca comprising:
    (a) providing a vessel in a vaccum chamber said vessel consisting essentially of graphite having a density of about 1.5 g/cm$^3$ or more;
    (b) charging said silicon having said one or more impurities into said graphite vessel;
    (c) applying electron beam irradiation to said silicon having said one or more impurities within said vessel to heat the same to its melting point without evaporating said silicon while maintaining the vacuum in said chamber; and
    (d) evacuating said one or more of said impurities from said silicon and from said vessel while maintaining said silicon in the molten form to obtain a purified silicon product.

2. The process as defined in claim 1, further comprising:
    providing target concentrations of impurities in the purified silicon product, and
    controlling the concentrations of impurities contained in the graphite vessel material to values that are lower than said target concentrations of said impurities in said purified silicon product.

3. A process for removing from silicon one or more impurities selected from the group consisting of P, Al and Ca comprising:
    (a) providing a plurality of successively arranged vessels in a vaccum chamber, each of said vessels is positioned lower than its predecessor and consisting essentially of graphite having a density of about 1.5 g/cm$^3$ or more;
    (b) charging said silicon having said one or more impurities into the uppermost vessel and thereafter transferring the silicon successively into successive ones of the graphite vessels;
    (c) applying electron beam irradiation to the silicon within each of said successively arranged graphite vessels to heat the silicon contained therein to its melting point without evaporating said silicon while maintaining the vacuum in said chamber;
    (d) evacuating said one or more of said impurities from the silicon within each of said vessels while maintaining said silicon in the molten form.

* * * * *